(12) United States Patent
Abdo et al.

(10) Patent No.: US 12,392,672 B2
(45) Date of Patent: Aug. 19, 2025

(54) PRINTABLE IRREVERSIBLE MINIMUM TEMPERATURE INDICATOR

(71) Applicant: Temptime Corporation, Morris Plains, NJ (US)

(72) Inventors: Mohannad Abdo, Clifton, NJ (US); Thaddeus Prusik, Stroudsburg, PA (US)

(73) Assignee: ZEBRA TECHNOLOGIES CORPORATION, Lincolnshire, IL (US)

( * ) Notice: Subject to any disclaimer, the term of this patent is extended or adjusted under 35 U.S.C. 154(b) by 710 days.

(21) Appl. No.: 17/292,323

(22) PCT Filed: Nov. 6, 2019

(86) PCT No.: PCT/US2019/059988
§ 371 (c)(1),
(2) Date: May 7, 2021

(87) PCT Pub. No.: WO2020/097154
PCT Pub. Date: May 14, 2020

(65) Prior Publication Data
US 2021/0396601 A1    Dec. 23, 2021

Related U.S. Application Data

(60) Provisional application No. 62/756,794, filed on Nov. 7, 2018.

(51) Int. Cl.
*G01K 11/18* (2006.01)
*C09D 11/50* (2014.01)

(52) U.S. Cl.
CPC ............ *G01K 11/18* (2013.01); *C09D 11/50* (2013.01)

(58) Field of Classification Search
CPC ......... G01K 11/18; G09D 11/50; C09D 11/50
USPC ........................................ 116/216
See application file for complete search history.

(56) References Cited

U.S. PATENT DOCUMENTS 2,826,073 A * 3/1958 Huyck et al.
4,929,091 A * 5/1990 Kostic ............... G01K 11/16
374/162
5,375,271 A * 12/1994 Frankel ............. A47K 3/002
4/581

(Continued)

FOREIGN PATENT DOCUMENTS

CN    107483662 A * 12/2017 ............ H04M 1/026
DE    102014017535 A1 * 6/2016 ............ B42D 25/36

(Continued)

OTHER PUBLICATIONS

7292323_2023-12-12_WO_2020097154_A1_H.pdf,May 14, 2020.*

(Continued)

*Primary Examiner* — Randy W Gibson
(74) *Attorney, Agent, or Firm* — K&L Gates LLP

(57) ABSTRACT

A multi-event minimum temperature indicator that includes a substrate, at least two thermochromic compositions positioned on the substrate, and an optional top layer adhered to the substrate. Each thermochromic composition is positioned on a discrete area of the substrate, and the compositions provide a visual indication of exposure to progressively colder temperatures.

24 Claims, 4 Drawing Sheets

TOP VIEW OF A FIVE SECTION TEMPERATURE EVENT RECORDER

AS SHOWN THE THERMOCHROMIC COMPOSITIONS THAT CHANGE FROM COLORLESS TO YELLOW AND ORANGE AT THE RESPECTIVE TEMPERATURES OF 4° C AND 2° C HAVE ALREADY BEEN ACTIVATED WHILE LOWER TEMPERATURE ACTIVATED COMPOSITIONS HAVE NOT AND ARE STILL TRANSPARENT.

(56) References Cited

U.S. PATENT DOCUMENTS

| | | | | |
|---|---|---|---|---|
| 5,484,205 | A * | 1/1996 | Grupp | G01K 1/02 374/162 |
| 6,592,255 | B1 * | 7/2003 | Duroux | B60R 1/12 374/162 |
| 7,712,431 | B2 * | 5/2010 | Roche | G01K 1/14 374/106 |
| 10,408,686 | B2 * | 9/2019 | Newport | A23L 3/00 |
| 11,572,486 | B2 * | 2/2023 | Aida | G01K 11/16 |
| 11,933,677 | B2 * | 3/2024 | Aida | C09K 9/02 |
| 12,085,452 | B2 * | 9/2024 | Aida | C09K 9/02 |
| 2002/0157464 | A1 * | 10/2002 | Rait | G01F 23/22 73/293 |
| 2007/0207280 | A1 * | 9/2007 | Wolfe | G09F 9/30 428/34.1 |
| 2008/0063026 | A1 * | 3/2008 | Roche | G01K 11/12 374/E11.018 |
| 2010/0012018 | A1 * | 1/2010 | Ribi | G01K 3/04 252/182.13 |
| 2013/0068155 | A1 | 3/2013 | Patel | |
| 2014/0044609 | A1 | 2/2014 | Prusik et al. | |
| 2014/0154808 | A1 | 6/2014 | Patel | |
| 2015/0219505 | A1 | 8/2015 | Parker et al. | |
| 2015/0308901 | A1 * | 10/2015 | Salman | G01K 3/04 374/102 |
| 2016/0076947 | A1 | 3/2016 | Ribi | |
| 2016/0153843 | A1 | 6/2016 | Edson et al. | |
| 2016/0349225 | A1 | 12/2016 | Prusik et al. | |
| 2017/0363479 | A1 * | 12/2017 | Harvey | G01K 11/12 |
| 2019/0346415 | A1 * | 11/2019 | Abdo | G01K 3/04 |
| 2019/0383649 | A1 | 12/2019 | Abdo et al. | |
| 2020/0003631 | A1 | 1/2020 | Sambongi et al. | |
| 2020/0041359 | A1 | 2/2020 | Aida et al. | |
| 2020/0048542 | A1 | 2/2020 | Umemoto | |
| 2020/0309607 | A1 | 10/2020 | Small et al. | |
| 2021/0034933 | A1 | 2/2021 | Abdo et al. | |
| 2021/0215551 | A1 | 7/2021 | Fonk et al. | |

FOREIGN PATENT DOCUMENTS

| | | | | |
|---|---|---|---|---|
| JP | 3474423 B2 | * | 12/2003 | |
| JP | 2005220089 A | * | 8/2005 | |
| WO | WO-9628714 A1 | * | 9/1996 | G01K 3/04 |
| WO | WO-2013028804 A1 | * | 2/2013 | B41M 3/005 |
| WO | WO 2014/153446 | | 9/2014 | |
| WO | WO-2014153446 A1 | * | 9/2014 | G01K 11/12 |
| WO | WO 2015/128655 | | 9/2015 | |
| WO | WO-2020097154 A1 | * | 5/2020 | C09D 11/50 |

OTHER PUBLICATIONS

17292323_2023-12-13_JP_2005220089_A_H.pdf,Aug. 18, 2005.*
17292323_2023-12-12_WO_9628714_A1_H.pdf,Sep. 19, 1996.*
17292323_2023-12-13_DE_102014017535_A1_H.pdf,Jun. 2, 2016.*
17292323_2023-12-13_WO_2014153446_A1_H.pdf,Sep. 25, 2014.*
17292323_2024-10-24_CN_107483662_A_H.pdf,Dec. 15, 2017.*
17292323_2024-10-29_JP_3474423_B2_H.pdf,Dec. 8, 2003.*
17292323_2024-10-29_WO_2013028804_A1_H.pdf,Feb. 28, 2013.*
17292323_2024-10-29_GB_2167201_A_H.pdf,May 21, 1986.*
International Search Report and Written Opinion mailed Jan. 16, 2020 issued for International PCT Application No. PCT/US19/59988.
International Search Report dated Jan. 24, 2023 issued for International PCT Application No. PCT/US2022/046016.

* cited by examiner

TOP VIEW OF A FIVE SECTION TEMPERATURE EVENT RECORDER

AS SHOWN THE THERMOCHROMIC COMPOSITIONS THAT CHANGE FROM COLORLESS TO YELLOW AND ORANGE AT THE RESPECTIVE TEMPERATURES OF 4°C AND 2°C HAVE ALREADY BEEN ACTIVATED WHILE LOWER TEMPERATURE ACTIVATED COMPOSITIONS HAVE NOT AND ARE STILL TRANSPARENT.

PRINTABLE IRREVERSIBLE MINIMUM TEMPERATURE INDICATOR

CROSS REFERENCE TO RELATED APPLICATIONS AND PRIORITY CLAIM

The present application claims the benefit under 35 U.S.C. § 371 to International Application Number PCT/US2019/059988 filed on Nov. 6, 2019 which claims the priority of U.S. Provisional Patent Application No. 62/756,794 filed on Nov. 7, 2018. The entire disclosures of said applications are incorporated by reference herein for all purposes.

FIELD

This disclosure pertains to the field of thermochromic pigment systems. More particularly, some embodiments include printed patterns of irreversible thermochromic compositions having a controllable color transition range across a hysteresis window of the system and where the printed patterns function as a descending temperature indicator, i.e., a minimum temperature indicator.

BACKGROUND

Many commercial products are temperature sensitive and can spoil, deteriorate or lose quality if they suffer even brief exposure to a temperature near or below freezing. For example, fruits may turn brown, flowers, salad greens, some herbs may wilt, and vaccines may lose potency if exposed to a freezing temperature. Some other freeze-sensitive products include pharmaceutical products, medications, blood products, and health care products containing freeze-sensitive products such as natural, synthetic or recombinant proteins and polypeptides, as well as foodstuffs, beverages, and some industrial products, for example emulsions and latex paints. Some products can suffer a loss of quality owing to exposure to an unduly cold temperature without exhibiting any clear change in appearance.

To help monitor the possible presence of such invisible, or hidden, loss of quality, low-cost freeze and/or threshold indicators can be employed. However, one disadvantage of freeze indicators is their size, which can prevent their application to individual containers or vials. Instead, one indicator may be associated with a number of items in a single container; however, temperature variations within the container mean that not all of the items have experienced the same thermal history.

Another disadvantage of many current freeze indicators is their inherent unpredictability due to the complicated nature of the freezing. For example, the first step for many compositions in the freezing process is nucleation; however, nucleation is often found to be very sensitive to impurities in the system. These impurities may be too small to be seen by the naked eye, but still can control the rate of nucleation and, hence, the temperature at which a change in the composition is observable.

Yet another disadvantage of current indicators is that they are single-event indicators. In other words, they can provide an indication of exposure to a single temperature. For example, if an indicator registers at 0° C., that indicator would not indicate whether a monitored product was exposed to any temperature below 0° C. Indicators exposed to −10° C. and −20° C. would appear identical to an indicator exposed to 0° C.

To address some of these issues, electronic temperature data loggers are currently used to provide a temperature history. Due to their expense and size, usually one data logger is used in a shipment of multiple samples. A simple low-cost, multiple-event recorder is not available.

Thus, there is a need for minimum temperature indicators, preferably irreversible indicators, that are smaller and/or that provide useful information about exposure to multiple low temperatures despite the inherent variation in actual response temperature.

SUMMARY

Disclosed herein are printable minimum temperature indicators that utilize thermochromic compositions arranged in a pattern to provide an indication, preferably an irreversible indication, of exposure to progressively colder temperatures. In some embodiments, the indicator is a small, flexible, low-cost single- or multiple-event temperature recorder capable of being manufactured easily such as by printing and suitable for attachment to small items such as vaccine bottles. The multiple-event mode can be preferred as it can be used to indicate how near to a critical temperature the recorder has come. Such an indication can be distinct from a simple "yes/no" indication, providing instead qualitative information about the thermal history of the monitored product.

In addition, some embodiments of the present disclosure include a multi-event minimum temperature indicator that includes a substrate, at least two thermochromic compositions positioned on the substrate, and an optional top layer adhered to the substrate. Each thermochromic composition may be positioned on a discrete area of the substrate, and the compositions provide a visual indication of exposure to progressively colder temperatures with each composition providing a visual indication of exposure to a different temperature.

Further, some embodiments of a multi-event minimum temperature indicator include a substrate and at least two thermochromic compositions positioned on the substrate to provide a visual indication of exposure to progressively colder temperatures. Each thermochromic composition is positioned on a discrete area of the substrate. In some embodiments, the discrete areas form a pattern. Some embodiments further include a top layer adhered to the substrate, although some embodiments do not require any top layer.

Some embodiments further include an adhesive layer applied to the substrate. In some embodiments, the thermochromic compositions are printed on the substrate. In some embodiments, the compositions are at least partially impregnated within the substrate.

According to some embodiments, the thermochromic compositions are functionally irreversible in their visual indication of exposure to progressively colder temperatures. Each of the thermochromic compositions may provide a visual indication of exposure to a temperature at or below a respective first threshold and substantially maintains that visual indication up to a temperature at or above a respective second threshold. In some embodiments, the second threshold of at least one thermochromic composition is at least 5° C., at least 7° C., at least 10° C., at least 15° C., at least 20° C., at least 22° C., at least 25° C., at least 30° C., at least 35° C., or at least 40° C. higher than the first threshold of that thermochromic composition. In some embodiments, the respective second thresholds of at least two thermochromic compositions is at least 5° C., at least 7° C., at least 10° C., at least 15° C., at least 20° C., at least 22° C., at least 30° C., at least 35° C., or at least 40° C. higher than the respective first thresholds of the at least two thermochromic compositions. In some embodiments, the indicator is configured to provide an indication of exposure to progressively colder temperatures in increments of 0.5° C., 1° C., 1.5° C., 2° C., 2.5° C., 3° C., 4° C., 5° C., 6° C., 7° C., 8° C., 9° C., or 10° C. According to some embodiments, an initial threshold temperature of the progressively colder temperatures is about 15° C., about 10° C., about 9° C., about 8° C., about 7° C., about 6° C., about 5° C., about 4° C., about 3° C., about 2° C., about 1° C., about 0° C., about −1° C., about −2° C., about −3° C., about −4° C., about −5° C., about −6° C., about −7° C., about −8° C., about −9° C., about −10° C., or about −15° C. In some embodiments, an initial threshold temperature of the progressively colder temperatures is from about 10° C. to about −20° C., from about 5° C. to about −20° C., or from about 5° C. to about −10° C.

According to some embodiments, the discrete areas of the at least two thermochromic compositions do not overlap with each other. In some embodiments, the visual indication provided by the at least two thermochromic compositions is a change in color. In some embodiments, the visual indication provided by the at least two thermochromic compositions is a darkening in appearance or a transition of clear or transparent or translucent to opaque. In some embodiments, the visual indication provided by the at least two thermochromic compositions is a lightening in appearance, or a transition from opaque to clear. In some embodiments, the substrate is colored to contrast with a color of the at least two thermochromic compositions. In some embodiments, the color of the at least two thermochromic compositions is the visual indication. In some embodiments, the color is the appearance of the at least two thermochromic compositions prior to the visual indication.

According to some embodiments, the substrate includes printed information identifying the discrete areas having thermochromic composition thereon. In some embodiments, the printed information is positioned at least partially under the thermochromic composition so as to be either at least partially obscured or revealed by the visual indication. In some embodiments, the discrete areas of the at least two thermochromic compositions are arranged in at least one of the following patterns: concentric circles, sequential arrows, a vertical line, a horizontal line, a circle, a triangle, and a square. In some embodiments, the discrete areas form a bar code or a portion of a bar code that is readable by an optical scanning device, wherein the visual indication provided by the thermochromic composition affects the appearance of the bar code, and wherein the changed appearance of the bar code provides a different signal to the optical scanning device. In some embodiments, the change in appearance of the bar code comprises revealing additional elements of the bar code. In some embodiments, the change in appearance of the bar code comprises obscuring at least some elements of the bar code.

According to some embodiments, the at last two thermochromic compositions are two, three, four, five, six, seven, eight, nine, or ten different thermochromic compositions, each one configured or selected to provide a visual indication of exposure to a different temperature.

Some embodiments discussed herein include methods of making a multi-event minimum temperature indicator. Such methods can include applying the at least two thermochromic compositions to the substrate in discrete areas of the substrate. Some embodiments further include securing an optional top layer to the substrate. In some embodiments, applying the at least two thermochromic compositions is achieved by a printing technique.

Some embodiments discussed herein include a temperature-sensitive product packaging having a multi-event minimum temperature indicator according to this disclosure secured thereto. In some embodiments, the product is a vaccine, medicine, pharmaceutical, food product, or other temperature-sensitive product. In some embodiments, the product packaging is a bottle or vial. In some embodiments, the indicator is secured to a lid of a bottle or vial.

The features mentioned according to the embodiments described above can also be combined with each other and are not limited to the explicitly mentioned embodiments. These and other features are disclosed in greater detail in the accompanying figures and the Detailed Description below.

DETAILED DESCRIPTION

The present disclosure is directed to temperature event recorders constructed from a multilayer laminate comprising a base substrate on to which selected thermochromic formulations are coated or printed or otherwise adhered at discrete intervals and over which a transparent protective top layer may be attached. Optionally, the base substrate has an adhesive layer to facilitate attachment to a product such as a vaccine bottle.

Thermochromic formulations that display essentially an irreversible change when a particular temperature is reached are known. For example, U.S. Pat. No. 9,695,320—which is incorporated herein in its entirety—describes thermochromic compositions as well as microencapsulated slurries of them for use in inks. The author of the present disclosure contemplates the use of such thermochromic compositions; however, for the applications discussed herein microencapsulation is not required.

Dyes that change color over a range of temperatures are known as thermochromic compositions or dyes. Some thermochromic dyes darken or lighten in response to a change in temperature. Some thermochromic dyes transition from clear, transparent, or translucent to cloudy or opaque or transition from cloudy or opaque to clear, transparent, or translucent. Thermochromic dyes can be manufactured to have a color change that is reversible or irreversible. Formulated as pigments or colorants, they are used in a variety of applications such as plastic masterbatch, paper, textiles, coatings, offset ink, metal decorating inks, coatings, ultraviolet radiation curable inks and coatings, solvent based inks and coatings, screen inks and coatings, gravure inks and coatings, paints, security printing, brand protection, smart packaging, marketing and novelty printing, among other uses.

Figure 1:
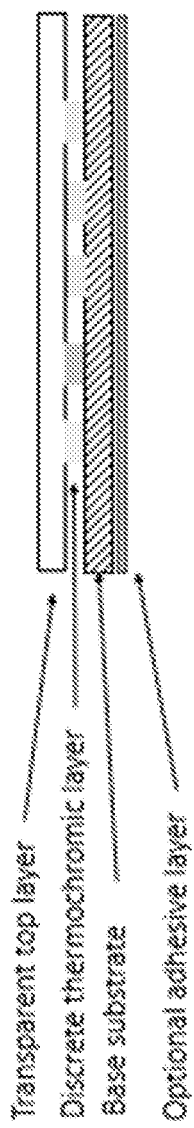
FIG. 1 is a cross-section of an embodiment of a minimum temperature indicator according to the present disclosure.

FIG. 1 illustrates the layered or laminated nature of some embodiments of the present disclosure. FIG. 1 is a cross-sectional view showing a substrate upon which is printed two or more thermochromic dyes in discrete areas on the substrate. Over the substrate is applied a transparent top layer. The discrete areas may or may not overlap with each other. Overlapping areas may provide a smooth visual appearance of progressively colder temperatures. Non-overlapping areas may be more easily distinguishable when determining what the lowest temperature exposure is or has been.

The base substrate may have a color that contrasts with the thermochromic compositions. The contrast may occur either before or after exposure to a predetermined minimum temperature. The color of the substrate may an inherent color of the substrate material or may be a color applied to the substrate, such as a coating of paint, ink, or dye applied to the substrate prior to the thermochromic compositions being applied to the substrate.

Figure 2:
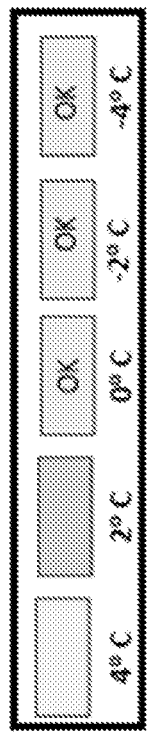
FIG. 2 is a top view of another embodiment of a minimum temperature indicator according to the present disclosure.

In some embodiments, thermochromic compositions with different temperature responses are applied to the base substrate. In some embodiments, the thermochromic compositions are applied to the underside of the transparent top layer depending on manufacturing considerations. Each thermochromic composition may change from one optical state—such as a color—to another different optical state when its threshold temperature is reached. In some instances one of these optical states is that of transparency. In some embodiments, a transparent state is indicated by a light blue color in the figures. In the transparent state any optional printing on the base substrate underneath that particular thermochromic composition can be easily viewed as shown in FIG. 2. The transparent top layer may also be reverse printed with transparent colored sections that coincide in location and shape with those of the printed thermochromic compositions beneath, thereby giving greater flexibility to the overall visual nature of the display.

The base substrate can be made from a variety of materials such as a polymer film or paper or cardboard or fabric. In some embodiments, it is preferable that the base material provide contrast to the thermochromic material deposited on it. Usefully it can also be printed as indicated in FIG. 2. Thus, in some embodiments, it is preferred that the substrate be opaque. In some embodiments, the base substrate is a bottle cap or other aspect of a container or component that can be easily incorporated into or onto a vial, bottle, container, or product packaging.

In some embodiments, an adhesive layer is located on the underside of the base material to facilitate attachment of the thermal event recorder to a product. In some embodiments, the type of adhesive used can be customized to the surface to which the thermal event recorder is adhered.

The transparent top layer may provide protection from abrasion or other adventitious damage to the thermochromic compositions and allows easy viewing of their color. This layer can, for example, be a polymer film or a protective coating. Suitable top layers may be adhered not just to a periphery of the base substrate but also in most or all of the areas between the top layer and base substrate where there is no thermochromic composition so as to maintain each thermochromic composition in its originally printed location.

Figure 3:
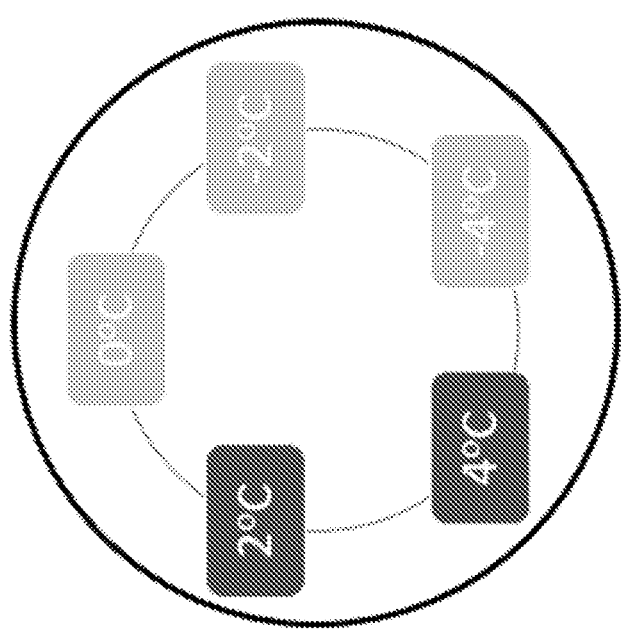
FIG. 3 is a top view of another embodiment of a minimum temperature indicator according to the present disclosure.
Figure 4:
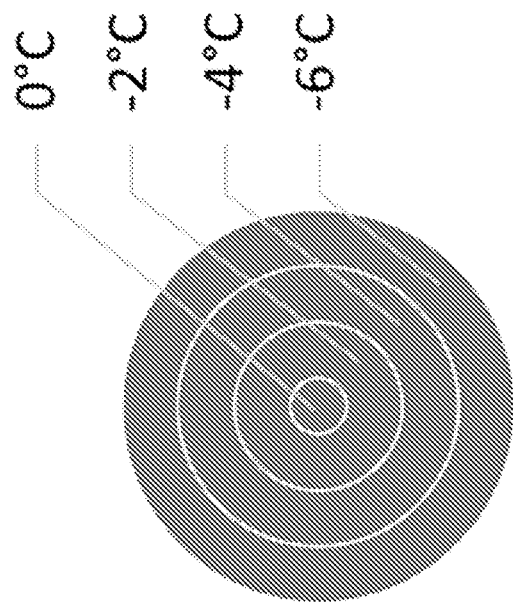
FIG. 4 is a top view of another embodiment of a minimum temperature indicator according to the present disclosure.
Figure 5:
FIG. 5 is a top view of another embodiment of a minimum temperature indicator according to the present disclosure.

Suitable thermochromic compositions may be applied to the base substrate either from solution, or as an ink or from a melt or as a preformed solid. They may be applied in all manner of different shapes or patterns. FIG. 3 provides an example of one such pattern, in which discrete cells or indicator areas are arrange in a circle such that each indicator area is triggered in a circular pattern as the indicator is exposed to progressively cooler temperatures. FIG. 4 illustrates another suitable pattern in which the cells or indicator areas are arranged as concentric circles. In this embodiment, progressively colder temperatures first trigger the outer circle and then move inward. In some embodiments, the first indicator area to be triggered is the center circle with each outer circle being triggered as the temperature continues to drop. FIG. 5 illustrates another suitable pattern in which each cell or indicator area is an arrow, and the arrows are arranged in a linear fashion. In some embodiments, the arrows could be arranged in a circle or other pattern to indicate a progression of colder temperatures. In some embodiments, the thermochromic compositions are arranged in concentric circles, sequential arrows, a vertical line, a horizontal line, a circle, a triangle, a square, or combinations of these patterns and shapes.

According to some embodiments, the pattern formed by the thermochromic compositions is a bar code or a portion of a bar code that is scannable by an optical electronic device. One-dimensional and two-dimensional codes or patterns may be used. For example, the thermochromic compositions may be printed in lines that form a part of a bar code such that when the compositions either darken or lighten in response to minimum temperatures, the information provided by the bar code changes. The changed information may be the result of the thermochromic composition(s) being optically scannable or from the composition(s) obscuring or revealing an underlying bar code.

Whatever the particular pattern employed, it will provide a record of specific temperature events that the indicator (and, therefore, the product to which it is attached) has been exposed. Moreover, providing multiple cells or indicator areas provides qualitative information about temperature exposure. This can be an advantage even if a user monitoring the indicator questions the accuracy of the specific thermochromic composition used. Using only a single-event indicator not only provides limited information but also reduces the confidence one might have in the indication if there is some question as to the accuracy of the thermochromic composition used.

The indicators discussed herein utilize at least two thermochromic compositions to provide a multi-event indicator. In some embodiments, the number of different thermochromic compositions is two, three, four, five, six, seven, eight, nine, or ten. In some embodiments, each composition is distinct from the others so as to respond at a different temperature. In some embodiments, other modifications are made so that a single composition positioned at different locations on the substrate may be used to provide an indication of exposure to two or more temperatures.

As illustrated in the figures, some embodiments include printed information indicating the temperature at which a given composition changes color, optical density, or opacity. The printed information may be printed on the substrate, top layer, or both and may include temperature information or a simple message, such as "YES," "NO," "SAFE," "UNSAFE," "EXPIRED," "FROZEN," etc. In some embodiments, the printed information is at least partially obscured or revealed by the thermochromic compositions either before or after they provide a visual indication. In some embodiments, the color of the printed information may contrast or correspond to a color of the thermochromic composition either the color of the visual indication or the color exhibited prior to the visual indication.

In some embodiments, the top layer and thermochromic composition-coated base layer are laminated together, for instance thermally or adhesively. All of the various components can be combined in a roll to roll fashion from which the individual thermal event recorders can be cut. This provides for low-cost and fast manufacturing.

The thermal event recorders, or thermochromic indicators, may be applied to a product or a product packaging that may include a bottle, a vial, a lid, a cap, or a box. The indicators may be printed directly on a product or a product packaging or may be placed thereon.

In some embodiments, suitable thermochromic compositions or dyes use colorants that are either liquid crystals or leuco dyes. Liquid crystals are generally used less frequently than leuco dyes because they are very difficult to work with and require highly specialized printing and handling techniques.

Some thermochromic dyes are a system of interacting parts. The parts of the system are leuco dyes acting as colorants, weak organic acids acting as color developers, and solvents that variably interact with components of the system according to the temperature of the system. Some thermochromic dye systems are microencapsulated in a protective coating to protect the contents from undesired effects from the environment.

In some embodiments, the system is colored below the activation temperature and is clear or lightly colored above the activation temperature. The activation temperature corresponds to a range of temperatures at which the transition is taking place between the full color point and the clearing point. Generally, the activation temperature is defined as the temperature at which the human eye can perceive that the system is starting to lose color, or alternatively, starting to gain color. Some thermochromic systems are designed to have activation temperatures over a broad range, from about −20° C. to about 80° C. or higher.

Some specific thermochromic ink formulations are known in the art. See, for example, U.S. Pat. Nos. 4,720,301; 5,219,625; 5,558,700; 5,591,255; 5,997,849; 6,139,779; 6,494,950; 7,494,537; and 9,695,320, all of which are expressly incorporated herein by reference to the same extent as though fully replicated herein. Thermochromic inks are available in various colors, with various activation temperatures, clearing points and full color points. Thermochromic inks may be printed by offset litho, dry offset, letterpress, gravure, flexo, and screen processes, amongst others. Thermochromic inks containing leuco dyes are available for all major ink types such as water-based, ultraviolet cured and epoxy. The properties of these inks differ from process inks. For example, most thermochromic inks contain the thermochromic systems as microcapsules, which are not inert and insoluble as are ordinary process pigments. The size of the microcapsules containing the thermochromic systems ranges typically between 3-5 μm which is more than 10-times larger than typical pigment particles as found in most inks.

Suitable thermochromic compositions, dyes, or inks can be reversible although some are considered irreversible due to hysteresis—a phenomenon in which the value of a physical property lags behind changes in the effect causing it. In other words, some thermochromic compositions will provide a visual indication of exposure to a temperature at or below a threshold temperature and then maintain that visual indication even if the temperature later increases above that threshold temperature although the visual indication may reverse or disappear if the temperature increases above a second threshold, higher temperature. For example, in some embodiments, the second threshold temperature is at least 5° C., at least 7° C., at least 10° C., at least 15° C., at least 20° C., at least 22° C., at least 25° C., at least 30° C., at least 35° C., or at least 40° C. above the first threshold temperature. In this way, thermochromic compositions can be used to achieve a functionally irreversible record of exposure to low temperatures.

Thermochromic compositions suitable for use with the contemplated embodiments include compositions that provide a visual indication of exposure to temperatures below about 20° C., below about 15° C., below about 10° C., below about 7° C., below about 5° C., below about 2° C., below about 0° C., below about −2° C., below about −5° C., below about −7° C., below about −10° C., below about −15° C., above about −30° C., above about −25° C., above about −20° C., above about −15° C., between about 10° C. and about −20° C., between about 10° C. and about −15° C., or between about 5° C. and about −10° C. In some embodiments, the thermochromic indicator includes two or more different thermochromic compositions with each composition configured or selected to provide a visual indication of exposure to a different temperature. The difference between each temperature may be the same or different and may be about 0.25° C., about 0.5° C., about 0.75° C., about 1° C., about 1.5° C., about 2° C., about 3° C., about 4° C., or about 5° C. The total temperature range covered by all the thermochromic compositions in a given indicator may be about 2° C., about 5° C., about 10° C., or about 20° C.

Embodiments

Embodiment 1. A multi-event minimum temperature indicator comprising:
  a substrate;
  at least two thermochromic compositions positioned on the substrate, each thermochromic composition positioned on a discrete area of the substrate; and
  an optional top layer adhered to the substrate;
  wherein the at least two thermochromic compositions provide a visual indication of exposure to progressively colder temperatures.

Embodiment 2. The indicator of embodiment 1, further comprising an adhesive layer applied to the substrate.

Embodiment 3. The indicator of embodiment 1 or 2, wherein the thermochromic compositions are printed on the substrate.

Embodiment 4. The indicator of embodiment 1, 2, or 3, wherein the thermochromic compositions are functionally irreversible in their visual indication of exposure to progressively colder temperatures.

Embodiment 5. The indicator of embodiment 1, 2, 3, or 4, wherein each of the thermochromic compositions provides a visual indication of exposure to a temperature at or below a respective first threshold and substantially maintains that visual indication up to a temperature at or above a respective second threshold.

Embodiment 6. The indicator of embodiment 5, wherein the second threshold of at least one thermochromic composition is at least 5° C., at least 7° C., at least 10° C., at least 15° C., at least 20° C., at least 22° C., at least 25° C., at least 30° C., at least 35° C., or at least 40° C. higher than the first threshold of that thermochromic composition.

Embodiment 7. The indicator of embodiment 5, wherein the respective second thresholds of at least two thermochromic compositions is at least 5° C., at least 7° C., at least 10° C., at least 15° C., at least 20° C., at least 22° C., at least 25° C., at least 30° C., at least 35° C., or at least 40° C. higher than the respective first thresholds of the at least two thermochromic compositions.

Embodiment 8. The indicator of embodiment 1, 2, 3, 4, 5, 6, or 7, wherein the indicator is configured to provide an indication of exposure to progressively colder temperatures in increments of 1° C., 1.5° C., 2° C., 2.5° C., 3° C., 4° C., 5° C., 6° C., 7° C., 8° C., 9° C., or 10° C.

Embodiment 9. The indicator of embodiment 1, 2, 3, 4, 5, 6, 7, or 8, wherein an initial threshold temperature of the progressively colder temperatures is about 15° C., about 10° C., about 9° C., about 8° C., about 7° C., about 6° C., about 5° C., about 4° C., about 3° C., about 2° C., about 1° C., about 0° C., about −1° C., about −2° C., about −3° C., about −4° C., about −5° C., about −6° C., about −7° C., about −8° C., about −9° C., about −10° C., or about −15° C.

Embodiment 10. The indicator of embodiment 1, 2, 3, 4, 5, 6, 7, or 8, wherein an initial threshold temperature of the progressively colder temperatures is from about 10° C. to about −20° C., from about 5° C. to about −20° C., or from about 5° C. to about −10° C.

Embodiment 11. The indicator of embodiment 1, 2, 3, 4, 5, 6, 7, 8, 9, or 10, wherein the discrete areas of the at least two thermochromic compositions do not overlap with each other.

Embodiment 12. The indicator of embodiment 1, 2, 3, 4, 5, 6, 7, 8, 9, 10, or 11, wherein the visual indication provided by the at least two thermochromic compositions is a change in color.

Embodiment 13. The indicator of embodiment 1, 2, 3, 4, 5, 6, 7, 8, 9, 10, 11, or 12, wherein the visual indication provided by the at least two thermochromic compositions is a darkening in appearance or a transition of clear or transparent or translucent to opaque.

Embodiment 14. The indicator of embodiment 1, 2, 3, 4, 5, 6, 7, 8, 9, 10, 11, or 12, wherein the visual indication provided by the at least two thermochromic compositions is a lightening in appearance, or a transition from opaque to clear.

Embodiment 15. The indicator of embodiment 1, 2, 3, 4, 5, 6, 7, 8, 9, 10, 11, 12, 13, or 14, wherein the substrate is colored to contrast with a color of the at least two thermochromic compositions.

Embodiment 16. The indicator of embodiment 15, wherein the color of the at least two thermochromic compositions is the visual indication.

Embodiment 17. The indicator of embodiment 15, wherein the color is the appearance of the at least two thermochromic compositions prior to the visual indication.

Embodiment 18. The indicator of embodiment 1, 2, 3, 4, 5, 6, 7, 8, 9, 10, 11, 12, 13, 14, 15, 16, or 17, wherein the substrate includes printed information identifying the discrete areas having thermochromic composition thereon.

Embodiment 19. The indicator of embodiment 18, wherein the printed information is positioned at least partially under the thermochromic composition so as to be either at least partially obscured or revealed by the visual indication.

Embodiment 20. The indicator of embodiment 1, 2, 3, 4, 5, 6, 7, 8, 9, 10, 11, 12, 13, 14, 15, 16, 17, 18, or 19, wherein the discrete areas of the at least two thermochromic compositions are arranged in at least one of the following patterns: concentric circles, sequential arrows, a vertical line, a horizontal line, a circle, a triangle, and a square.

Embodiment 21. The indicator of embodiment 1, 2, 3, 4, 5, 6, 7, 8, 9, 10, 11, 12, 13, 14, 15, 16, 17, 18, 19, or 20, wherein the discrete areas form a bar code or a portion of a bar code that is readable by an optical scanning device, wherein the visual indication provided by the thermochromic composition affects the appearance of the bar code, and wherein the changed appearance of the bar code provides a different signal to the optical scanning device.

Embodiment 22. The indicator of embodiment 21, where in the change in appearance of the bar code comprises revealing additional elements of the bar code.

Embodiment 23. The indicator of embodiment 21, where in the change in appearance of the bar code comprises obscuring at least some elements of the bar code.

Embodiment 24. The indicator of embodiment 1, 2, 3, 4, 5, 6, 7, 8, 9, 10, 11, 12, 13, 14, 15, 16, 17, 18, 19, 20, 21, 22, or 23, wherein the at last two thermochromic compositions are three, four, five, six, seven, eight, or nine different thermochromic compositions, each one configured or selected to provide a visual indication of exposure to a different temperature.

Embodiment 25. A method of making the a multi-event minimum temperature indicator of embodiment 1, 2, 3, 4, 5, 6, 7, 8, 9, 10, 11, 12, 13, 14, 15, 16, 17, 18, 19, 20, 21, 22, 23, or 24, the method comprising:
applying the at least two thermochromic compositions to the substrate in discrete areas of the substrate; and
securing the optional top layer to the substrate.

Embodiment 26. The method of embodiment 25, wherein applying the at least two thermochromic composition is achieved by a printing technique.

Embodiment 27. A temperature-sensitive product packaging having the multi-event minimum temperature indicator of embodiment 1, 2, 3, 4, 5, 6, 7, 8, 9, 10, 11, 12, 13, 14, 15, 16, 17, 18, 19, 20, 21, 22, 23, or 24 secured thereto.

Embodiment 28. The product packaging of embodiment 27, wherein the product is a vaccine, medicine, pharmaceutical, or food product.

Embodiment 29. The product packaging of embodiment 27 or 28, wherein the product packaging is a bottle or vial.

Embodiment 30. The product packaging of embodiment 29, wherein the indicator is secured to a lid of the bottle or vial.

Embodiment 31. A multi-event minimum temperature indicator comprising:
a substrate;
at least two thermochromic compositions positioned on the substrate, each thermochromic composition positioned on a discrete area of the substrate; and
wherein the at least two thermochromic compositions provide a visual indication of exposure to progressively colder temperatures.

Embodiment 32. The indicator of embodiment 31, further comprising a top layer adhered to the substrate.

Embodiment 33. The indicator of embodiment 31, further comprising an adhesive layer applied to the substrate.

Embodiment 34. The indicator of embodiment 31, wherein the thermochromic compositions are printed on the substrate.

Embodiment 35. The indicator of embodiment 31, wherein the thermochromic compositions are functionally irreversible in their visual indication of exposure to progressively colder temperatures.

Embodiment 36. The indicator of embodiment 31, wherein each of the thermochromic compositions provides a visual indication of exposure to a temperature at or below a respective first threshold and substantially maintains that visual indication up to a temperature at or above a respective second threshold.

Embodiment 37. The indicator of embodiment 31, wherein the indicator is configured to provide an indication of exposure to progressively colder temperatures in increments of 1° C., 1.5° C., 2° C., 2.5° C., 3° C., 4° C., 5° C., 6° C., 7° C., 8° C., 9° C., or 10° C.

Embodiment 38. The indicator of embodiment 31, wherein an initial threshold temperature of the progressively colder temperatures is about 15° C., about 10° C., about 9° C., about 8° C., about 7° C., about 6° C., about 5° C., about 4° C., about 3° C., about 2° C., about 1° C., about 0° C., about −1° C., about −2° C., about −3° C., about −4° C., about −5° C., about −6° C., about −7° C., about −8° C., about −9° C., about −10° C., or about −15° C.

Embodiment 39. The indicator of embodiment 31, wherein an initial threshold temperature of the progressively colder temperatures is from about 10° C. to about −20° C., from about 5° C. to about −20° C., or from about 5° C. to about −10° C.

Embodiment 40. The indicator of embodiment 31, wherein the discrete areas of the at least two thermochromic compositions do not overlap with each other.

Embodiment 41. The indicator of embodiment 31, wherein the visual indication provided by the at least two thermochromic compositions is a change in color.

Embodiment 42. The indicator of embodiment 31, wherein the visual indication provided by the at least two thermochromic compositions is a darkening in appearance or a transition of clear or transparent or translucent to opaque.

Embodiment 43. The indicator of embodiment 31, wherein the visual indication provided by the at least two thermochromic compositions is a lightening in appearance, or a transition from opaque to clear.

Embodiment 44. The indicator of embodiment 31, wherein the substrate is colored to contrast with a color of the at least two thermochromic compositions.

Embodiment 45. The indicator of embodiment 31, wherein the substrate includes printed information identifying the discrete areas having thermochromic composition thereon.

Embodiment 46. The indicator of embodiment 31, wherein the discrete areas form a bar code or a portion of a bar code that is readable by an optical scanning device, wherein the visual indication provided by the thermochromic composition affects the appearance of the bar code, and wherein the changed appearance of the bar code provides a different signal to the optical scanning device.

Embodiment 47. A method of making the a multi-event minimum temperature indicator of embodiment 31, the method comprising:
applying the at least two thermochromic compositions to the substrate in discrete areas of the substrate.

Embodiment 48. The method of embodiment 47, further comprising securing an optional top layer to the substrate Embodiment 49. The method of embodiment 47, wherein applying the at least two thermochromic compositions is achieved by a printing technique.

Embodiment 50. A temperature-sensitive product packaging having the multi-event minimum temperature indicator of embodiment 31 secured thereto.

Embodiment 51. The product packaging of embodiment 50, wherein the product packaging is a bottle or vial.

These and other embodiments are expressly contemplated by the author of this disclosure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments or features of embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A multi-event historical low temperature excursion exposure indicator comprising:
   a printable substrate; and
   a pattern on the substrate configured to provide a visual indication of prior exposure to progressively colder temperatures, the pattern including at least two thermochromic compositions each printed on a respective discrete area of the substrate, the at least two thermochromic compositions further comprising:
     a first thermochromic composition printed on a first discrete area of the substrate and having an initial color state, the first thermochromic composition changing from the initial color state when descending to a temperature below a first low temperature threshold to an exposed color state providing a first visual indication of prior exposure below the first low temperature threshold, the first thermochromic composition maintaining the first visual indication until the first thermochromic composition is exposed to a temperature higher than a first high temperature threshold, the first thermochromic composition reverting to the initial color state when exposed to the temperature higher than the first high temperature threshold; and
     a second thermochromic composition printed on a second discrete area of the substrate and having a second initial color state, the second thermochromic composition changing from the second initial color state when descending to a temperature below a second low temperature threshold to a second exposed color state providing a second visual indication of prior exposure below the second low temperature threshold, the second thermochromic composition maintaining the second visual indication until the second thermochromic composition is exposed to a temperature higher than a second high temperature threshold, the second thermochromic composition reverting to the second initial color state when exposed to the temperature higher than the second high temperature threshold,
   wherein the second low temperature threshold is lower than the first low temperature threshold,
   wherein the first and second low temperature thresholds are in the range of 15° C. to −20° C., and
   wherein the first high temperature threshold is at least 35° C. higher than the first low temperature threshold, and the second high temperature threshold is at least 35° C. higher than the second low temperature threshold.

2. The indicator of claim 1, wherein the first high temperature threshold is at least 40° C. higher than the first low temperature threshold.

3. The indicator of claim 1, wherein the first low temperature threshold is about 0° C.

4. The indicator of claim 1, wherein the first low temperature threshold is in the range of 5° C. to −10° C.

5. The indicator of claim 1, wherein the respective discrete areas do not overlap with each other.

6. The indicator of claim 1, wherein the visual indication provided by the at least two thermochromic compositions is a change in apparent color visible to a human eye.

7. The indicator of claim 1, wherein the visual indication provided by the at least two thermochromic compositions is a darkening in appearance or a transition from clear or transparent or translucent to opaque.

8. The indicator of claim 1, wherein the visual indication provided by the at least two thermochromic compositions is a lightening in appearance, or a transition from opaque to clear.

9. The indicator of claim 1, wherein the substrate is colored to contrast with a color of the at least two thermochromic compositions.

10. The indicator of claim 9, wherein the color of the at least two thermochromic compositions is the visual indication.

11. The indicator of claim 9, wherein the color is the appearance of the at least two thermochromic compositions prior to the visual indication.

12. The indicator of claim 9, wherein a printed information is positioned at least partially under the at least two thermochromic compositions so as to be either at least partially obscured or revealed by the visual indication.

13. The indicator of claim 1, wherein the respective discrete areas of the substrate are arranged in at least one of the following patterns: concentric circles, sequential arrows, a vertical line, a horizontal line, a circle, a triangle, and a square.

14. The indicator of claim 1, wherein the respective discrete areas form a bar code or a portion of a bar code that is readable by an optical scanning device, wherein the visual indication provided by the thermochromic composition affects the appearance of the bar code, and wherein the changed appearance of the bar code provides a different signal to the optical scanning device.

15. The indicator of claim 14, wherein the change in appearance of the bar code comprises revealing additional elements of the bar code.

16. The indicator of claim 14, wherein the change in appearance of the bar code comprises obscuring at least some elements of the bar code.

17. The indicator of claim 1, wherein the at least two thermochromic compositions are three, four, five, six, seven, eight, or nine different thermochromic compositions, each one configured or selected to provide a visual indication of exposure to a different temperature.

18. A method of making a multi-event historical low temperature excursion exposure indicator comprising:
    forming a pattern on a substrate, the pattern configured to provide a visual indication of prior exposure to progressively colder temperatures, the pattern being formed by applying at least two thermochromic compositions to a substrate,
    wherein the at least two thermochromic compositions further comprise:
        a first thermochromic composition positioned on a first discrete area of the substrate and, responsive to exposure to a temperature below a first low temperature threshold, providing a first visual indication of prior exposure to the temperature below the first low temperature threshold, the first thermochromic composition maintaining the first visual indication until the first thermochromic composition is exposed to a temperature higher than a first high temperature threshold, and
        a second thermochromic composition positioned on a second discrete area of the substrate and, responsive to exposure to a temperature below a second low temperature threshold, providing a second visual indication of prior exposure to the temperature below the second low temperature threshold, the second low temperature threshold being lower than the first low temperature threshold, the second thermochromic composition maintaining the second visual indication until the second thermochromic composition is exposed to a temperature higher than a second high temperature threshold,
        wherein the first and second low temperature thresholds are in the range of 15° C. to −20° C. and the first high temperature threshold is at least 35° C. higher than the first low temperature threshold, and the second high temperature threshold is at least 35° C. higher than the second low temperature threshold; and
    securing a top layer to the substrate.

19. A temperature-sensitive product packaging having the multi-event historical low temperature excursion exposure indicator of claim 1, secured thereto.

20. The product packaging of claim 19, wherein the product is a vaccine, medicine, pharmaceutical, or food product.

21. The product packaging of claim 19, wherein the product packaging is a bottle or vial.

22. A multi-event historical low temperature excursion exposure indicator comprising:
    a substrate;
    a pattern on the substrate configured to provide a visual indication of prior exposure to progressively colder temperatures, the pattern including
        a first thermochromic composition positioned on a first discrete area of the substrate and, responsive to exposure to a temperature below a first low temperature threshold, providing a first visual indication of prior exposure to the temperature below the first low temperature threshold, the first thermochromic composition maintaining the first visual indication until the first thermochromic composition is exposed to a temperature higher than a first high temperature threshold; and
        a second thermochromic composition positioned on a second discrete area of the substrate and, responsive to exposure to a temperature below a second low temperature threshold, providing a second visual indication of prior exposure to the temperature below the second low temperature threshold, the second low temperature threshold being lower than the first low temperature threshold, the second thermochromic composition maintaining the second visual indication until the second thermochromic composition is exposed to a temperature higher than a second high temperature threshold,
    wherein the first and second low temperature thresholds are in the range of 15° C. to −20° C. and the first high temperature threshold is at least 5° C. higher than the first low temperature threshold.

23. The indicator of claim 22, wherein the first high temperature threshold is at least 10° C. higher than the first low temperature threshold.

24. The indicator of claim 23, wherein the first high temperature threshold is at least 20° C. higher than the first low temperature threshold.

* * * * *